United States Patent
Eason et al.

(10) Patent No.: US 7,928,304 B2
(45) Date of Patent: Apr. 19, 2011

(54) INSTRUMENT SUPPORT APPARATUS HAVING NON-HORIZONTAL TIERS AND VERTICAL AXIS PIVOT CAPABILITY

(75) Inventors: Donald H. Eason, Fort Collins, CO (US); Steven Grant Fisher, Yorba Linda, CA (US)

(73) Assignees: Swift Distribution, Inc., Torrance, CA (US); Roland Corporation, Shizuoka (JP)

( * ) Notice: Subject to any disclaimer, the term of this patent is extended or adjusted under 35 U.S.C. 154(b) by 312 days.

(21) Appl. No.: 10/586,144

(22) PCT Filed: Jan. 14, 2005

(86) PCT No.: PCT/US2005/001372
§ 371 (c)(1),
(2), (4) Date: Jul. 14, 2006

(87) PCT Pub. No.: WO2005/067541
PCT Pub. Date: Jul. 28, 2005

(65) Prior Publication Data
US 2008/0229901 A1    Sep. 25, 2008

Related U.S. Application Data

(60) Provisional application No. 60/536,791, filed on Jan. 14, 2004.

(51) Int. Cl.
*G10D 13/02*    (2006.01)
(52) U.S. Cl. ............................................ 84/421; 84/412
(58) Field of Classification Search ...................... 84/412
See application file for complete search history.

(56) References Cited

U.S. PATENT DOCUMENTS

| 742,453 | A | 10/1903 | Lake |
| 1,309,375 | A | 7/1919 | Taylor |
| 1,376,593 | A | 5/1921 | Tuttle |
| 1,970,624 | A | 8/1934 | Recker |
| 2,902,592 | A | 9/1959 | Cole et al. |

(Continued)

FOREIGN PATENT DOCUMENTS

JP    05-038692    5/1993

(Continued)

OTHER PUBLICATIONS

Gibraltar Hardware, "Rack Factory" #GRS400C, Gibraltarhardware. com, Jan. 9, 2004, 2 pages.

(Continued)

*Primary Examiner* — Elvin G Enad
*Assistant Examiner* — Christopher Uhlir
(74) *Attorney, Agent, or Firm* — Santangelo Law Offices

(57) ABSTRACT

At least one embodiment of the inventive technology may be a support apparatus that includes at least two item support rails supported by support legs coupled thereto by pivot coupler apparatus that enable rotatable motion of a coupled support rail about a substantially vertical axis, where at least one of the item support rails is a non-horizontal item support rail, and where a cable passes through at least a portion of one or more of the support rails. In certain embodiments, the couplers may be height adjust couplers that enable substantially purely vertical, translatory height adjustment of coupled support rails and/or the couplers may couple item support rails to rail support legs at an angle other than ninety degrees. Items that may be supported include but are not limited to electronic percussion instruments.

30 Claims, 17 Drawing Sheets

U.S. PATENT DOCUMENTS

| | | |
|---|---|---|
| 3,463,520 A | 8/1969 | Turro |
| 3,514,091 A | 5/1970 | Johnson et al. |
| 3,603,623 A | 9/1971 | Widman |
| 3,604,734 A | 9/1971 | Friedman et al. |
| 3,823,245 A | 7/1974 | Suzuki |
| 3,945,291 A * | 3/1976 | Zickos .......................... 84/421 |
| 3,981,491 A | 9/1976 | Snyder |
| 3,997,724 A | 12/1976 | Seebinger |
| 4,102,219 A | 7/1978 | Plamper |
| 4,111,575 A | 9/1978 | Hoshino |
| 4,140,415 A | 2/1979 | Koyamato |
| 4,185,936 A | 1/1980 | Takahashi |
| 4,227,049 A | 10/1980 | Thomson et al. |
| 4,405,107 A | 9/1983 | Clyburn |
| 4,430,017 A | 2/1984 | Stefancich |
| 4,479,414 A | 10/1984 | Willis |
| 4,579,229 A | 4/1986 | Porcaro et al. |
| 4,593,596 A | 6/1986 | Gauger |
| 4,596,484 A | 6/1986 | Nakatani |
| 4,606,525 A | 8/1986 | Lombardi |
| 4,671,479 A | 6/1987 | Johnson et al. |
| 4,684,091 A | 8/1987 | Moreschi |
| 4,691,611 A | 9/1987 | May |
| D295,471 S | 5/1988 | Lindskog |
| 4,744,690 A | 5/1988 | Hsieh |
| 4,761,092 A | 8/1988 | Nakatani |
| 4,768,798 A | 9/1988 | Reed et al. |
| 4,770,380 A | 9/1988 | Eason et al. |
| 4,818,135 A | 4/1989 | Desjardins |
| D306,943 S | 4/1990 | Hodge et al. |
| 5,029,796 A | 7/1991 | Schoenig |
| D320,034 S | 9/1991 | Brooks et al. |
| 5,048,789 A | 9/1991 | Eason et al. |
| 5,063,821 A | 11/1991 | Battle |
| 5,069,254 A | 12/1991 | Vogelsang |
| D326,969 S | 6/1992 | Eason et al. |
| 5,140,889 A | 8/1992 | Segan et al. |
| D329,342 S | 9/1992 | Schoenig |
| 5,154,449 A | 10/1992 | Suei/Long |
| 5,161,761 A | 11/1992 | May |
| 5,182,416 A | 1/1993 | Schweizer |
| D336,099 S | 6/1993 | Schoenig |
| 5,337,646 A | 8/1994 | Austin |
| D356,901 S | 4/1995 | Schoenig et al. |
| D358,048 S | 5/1995 | Schoenig et al. |
| D364,281 S | 11/1995 | Eason |
| 5,520,292 A * | 5/1996 | Lombardi ................... 211/85.6 |
| 5,531,148 A | 7/1996 | Wilson |
| D372,691 S | 8/1996 | Eason |
| D375,639 S | 11/1996 | House et al. |
| 5,570,968 A | 11/1996 | Sassmannshausen et al. |
| 5,726,369 A | 3/1998 | Gilday |
| 5,744,738 A | 4/1998 | Gatzen |
| D400,565 S | 11/1998 | Ahl |
| D400,735 S | 11/1998 | House et al. |
| 5,857,649 A | 1/1999 | Eason |
| 5,911,523 A | 6/1999 | Burchart |
| 5,929,355 A * | 7/1999 | Adinolfi ......................... 84/421 |
| 5,949,008 A | 9/1999 | Augsburger |
| D416,464 S | 11/1999 | Eason |
| 5,996,814 A | 12/1999 | Workman et al. |
| D421,447 S | 3/2000 | Eason et al. |
| 6,062,396 A | 5/2000 | Eason |
| D435,365 S | 12/2000 | Eason et al. |
| 6,283,421 B1 | 9/2001 | Eason et al. |
| D450,339 S | 11/2001 | Eason |
| 6,343,802 B1 | 2/2002 | Workman et al. |
| 6,375,135 B1 | 4/2002 | Eason et al. |
| 6,610,916 B1 * | 8/2003 | Torrez ............................. 84/421 |
| 6,653,540 B2 | 11/2003 | Izen et al. |
| 6,719,257 B1 | 4/2004 | Greene et al. |
| 6,722,810 B1 | 4/2004 | Tachikawa |
| D492,587 S | 7/2004 | Eason |
| D493,363 S | 7/2004 | Eason |
| 6,789,772 B2 | 9/2004 | Eason |
| 6,814,332 B2 | 11/2004 | Eason |

FOREIGN PATENT DOCUMENTS

| | | |
|---|---|---|
| JP | 2000-155570 | 6/2000 |
| WO | WO 95/20107 | 7/1995 |
| WO | WO 2005/067541 A2 | 7/2005 |
| WO | WO 2005/070123 A2 | 8/2005 |
| WO | WO 2005/070132 A2 | 8/2005 |
| WO | WO 2005/070132 A3 | 8/2005 |
| WO | WO 2005/070184 A2 | 8/2005 |

OTHER PUBLICATIONS

Gibraltar Hardware, "Rack Factory" GRS400C, Gibraltarhardware. com, Oct. 25, 2004, 2 pages, Ride/Crash Overhead Station and Xhat to boom and Rack Options.

Gibraltar Hardware, "Rack Factory" GRS400C, Gibraltarhardware. com, Oct. 25, 2004, 2 pages, Mini Snare on Curved Support Tube Option.

Gibraltar Hardware, "Rack Factory" GRS400C and GRS150C, Gibraltarhardware.com, Oct. 25, 2004, 2 pages, Boom Arm to Rack and Multi-Cymbal Overhead Station Options.

Gibraltar Hardware, "Rack Factory" GRS250C, Gibraltarhardware. com, Oct. 25, 2004, 2 pages, Multi.

Cymbal Setup to rack, Mini Timbale to Rack, Tambourine to Open Tube, and Percussion Table to Open Tube Options.

Gibraltar Hardware, "Rack Factory" GRS350C, Gibraltarhardware. com, Oct. 25, 2004, 2 pages, Triple Cymbal Station to Rack and Large Tom to Rack Options.

Pintech, USA, Control the Sound with America's E Drum Color Brochure, 2004, 5 pages.

Roland Corporation, roland.com MDS-10RD, printed from website as of Nov. 5, 2004.

Roland Corporation, roland.com MDS-8C, printed from website as of Nov. 5, 2004.

Roland Corporation, roland.com MDS-6, printed from website as of Nov. 5, 2004.

Tama Hardware, PMD300FC Power Tower System, tama.com, Jan. 9, 2004, 1 page.

Tama Hardware, PMD800SS Power Tower System, tama.com, Jan., 9, 2004, 2 pages.

Ultimate Support Systems, Inc. 1992 Bicycle Repair Station Product Brochure (2 pages).

Ultimate Support Systems, Inc. 1993 Bicycle Support Product Catalog and Price List.

Ultimate Support Systems, Inc. 1993 Product Catalog (Music Stand Edition).

Ultimate Support Systems, Inc. 1994 Product Catalog (Music Stand Edition).

Ultimate Support Systems, Inc. 1995 Bicycle Support Domestic Confidential Dealer Price List.

Ultimate Support Systems, Inc. 1996 Product Catalog (Music Stand Edition).

Ultimate Support Systems, Inc. 1998 Product Catalog (Music Stand Edition).

Ultimate Support Systems, Inc. 1999 Product Catalog (Music Stand Edition).

Ultimate Support Systems, Inc. 2000 Product Catalog (Music Stand Edition).

Ultimate Support Systems, Inc. 2000 Bicycle Support Product Catalog.

Ultimate Support Systems, Inc. 2001 Product Catalog (Music Stand Edition).

Ultimate Support Systems, Inc. 2001/2002 Bicycle Support Product Catalog.

Ultimate Support Systems, Inc. 2002 Product Catalog (Music Stand Edition).

Ultimate Support Systems, Inc. 2003 Product Catalog (Music Stand Edition).

Ultimate Support Systems, Inc. 2004 Product Catalog (Bicycle Stand Edition).

Ultimate Support Systems, Inc. 2004 Product Catalog (Music Stand Edition).

Ultimate Support Systems, Inc. 2005 Product Catalog (Bicycle Stand Edition).

Ultimate Support Systems, Inc. 2005 Product Catalog (Music Stand Edition).

U.S. Appl. No. 60/536,791, filed Jan. 14, 2004, 15 pages, 11 drawings.

Yamaha Percussion System Drum Rack.

International application No. PCT/US05/00727; Written Opinion dated Sep. 19, 2006.

International application No. PCT/US05/00727; Search Report dated Sep. 19, 2006.

International application No. PCT/US05/00967; Written Opinion dated Sep. 26, 2006.

International application No. PCT/US05/00967; Search Report dated Sep. 26, 2006.

International application No. PCT/US05/01372; Written Opinion dated May 4, 2006.

International application No. PCT/US05/01372; Search Report dated May 4, 2006.

International application No. PCT/US05/00967; International Preliminary Report on Patentability issued Oct. 3, 2006.

International application No. PCT/US05/00727; International Preliminary Report on Patentability issued Oct. 11, 2006.

English Translation of Office Action for Parallel Japanese Patent Application No. 2006-549656 dated Aug. 16, 2010.

* cited by examiner

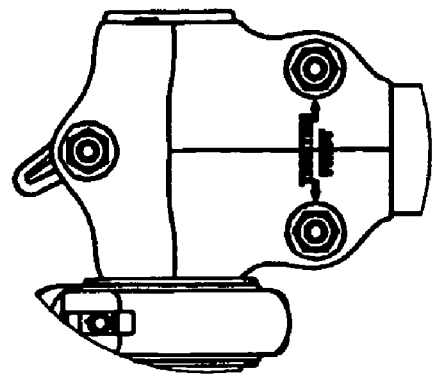
FIG. 1b(1)
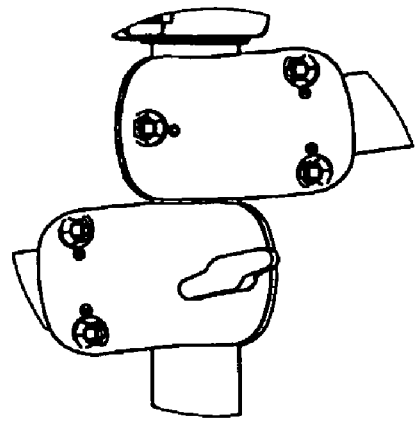
FIG. 1b(2)
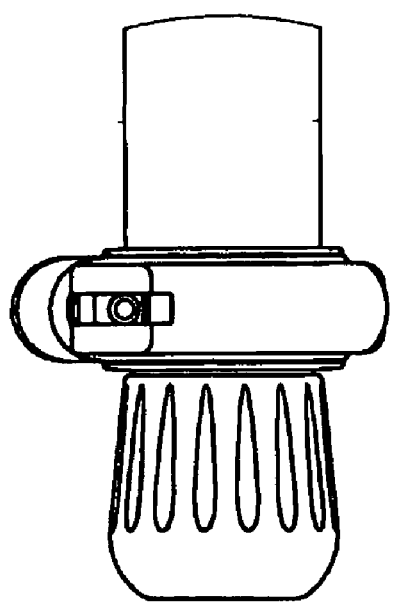
FIG. 1b(3)

INSTRUMENT SUPPORT APPARATUS HAVING NON-HORIZONTAL TIERS AND VERTICAL AXIS PIVOT CAPABILITY

This is an international application that claims benefit of and priority to U.S. Provisional Application, 60/536,791, filed Jan. 14, 2004, incorporated herein by reference.

TECHNICAL FIELD

The technical field to which embodiments of the inventive technology relate is item support. Specific embodiments relate to support of instruments, including musical instruments such as percussion instruments.

DISCLOSURE OF INVENTION

Generally, the inventive technology disclosed herein relates to a novel and useful stand for the support of items including but not limited to electronic percussion instruments that might be found as part of a electronic drum set. More specifically, an aspect of the inventive technology may involve instrument stands which use legs to support one or more rails to which items such as electronic percussion instruments can be attached, where at least a portion of one or more of these rails is higher in elevation than the remaining portion of that rail, where there is provided vertical axis pivot capability of one or more of the rails, and where a cable passes through at least a portion of one or more of the support rails. The aforementioned vertical axis may be defined by certain leg supports which themselves may be vertical so as to provide optimal support.

BACKGROUND

Some considerations relative to the use of percussion instrument support racks will be discussed to facilitate an understanding of the relevant technology. Typically, a percussion instrument support rack (a type of item support rack) will include rails and legs that support the rails. The rails themselves, which may have in other descriptions been referred to as tiers, may serve as attachment sites and provide support for percussion instruments (whether directly in the case where the percussion instrument is attached directly to the rail, or indirectly in the case where a riser or other attachment structure is attached to the rail and a percussion instrument is attached to the riser). Sometimes it may be appropriate to position all instruments at substantially the same height, but more often tradition or practicality requires placement of several instruments at varying heights above the supporting base (e.g., a floor). Most specifically in the case of percussion instruments, it is traditional as well as practically desirable to position the instruments so that they collectively follow first a rising sweep from left to center left and then smoothly transition or arch at center to a falling sweep from center right to right, allowing the user to play ascending and descending percussion patterns with ease. Of course, the terms center, left and right are with respect to a user of the instruments (e.g., a drummer), where center could be essentially that position that the user would face in assuming a position in preparation to use all the instruments. Other preferred placements of instruments might call for a variation or even a reversal of this sweep of instruments or might require a more abrupt change from a rising to a falling rail axis.

Another desirable function or attribute or characteristic of multi-railed instrument stands that at least partially surround a player is the ability to be adjusted for radial distance from the user. Since the stand partially surrounds the user, merely moving the stand closer to or farther away from the user in a single direction will result in an off-center user position, which is often detrimental to good instrument access in other directions. Thus it may be important in some applications that the radius of the arc approximated by the rail array (as projected on a horizontal plane), or a portion of that arc, be adjustable. It should also be noted that the commonly practiced placement of larger percussion instruments on one side of the user and smaller instruments on the other side of the user might require that the rail array more closely approximate (again, in its projection onto a horizontal plane) a segment of a spiral of expanding radius in order to maintain a more constant distance between the user and the inner edge of the supported instruments. Such a use may require that the relative horizontal angle of an outer rail to its adjacent inner rail be different for the left outer rail than for the right outer rail.

In providing or establishing pivot axes for radial or spiral horizontal rail array adjustment, it is important to understand the effects of non-verticality of the pivot axes. If such a pivot axis is not vertical, an outer rail end, while being pivoted about this axis, does not move in a horizontal arc, and thus the height of at least a portion of it changes simultaneously as its angular position (relative to another rail attached to it, e.g.,) changes. Such pivoting may raise or lower any leg attached to the rail under adjustment (e.g., to the outer end of the rail). In cases where the total number of legs is greater than three, this height change will result in a detrimental condition of non-coplanarity of the several legs' lower ends (feet)—the legs will no longer all contact the floor and will require significant additional adjustments to bring all feet back into contact with the floor. Additionally, this height change and/or the secondary adjustments needed to compensate for it can result in unintentional vertical tilting of the rail array (e.g., tilting in towards or out from a drummer seated in the center of the array), which may require yet more adjustment to correct. For these and perhaps other reasons, it may be desirable to provide and maintain vertical pivot axes for the inner ends of outer rails.

Yet another desirable function of instrument support racks may be the directing of cables (e.g., powering or signal cables for electronic drums) through an interior space defined by (e.g., within) a rail, from one point on the rail to another, e.g., from an end of the rail to the other, or from one end of a rail to a termination point or a point of ingress or egress at an intermediate location along the rail or rail span (as but a few examples). In this way signal and/or power cables associated with supported instruments can be hidden from view for a portion of their length, improving the stand's appearance and reducing tangling and snagging of cables during use, transport or storage.

Where a hollow member (e.g., a tube) is used as a rail, it is of course possible to create holes or ports in the rail sidewall at both ends of the rail, through which cables can pass. However, this practice requires a costly secondary aperture operation (e.g., drilling) to be performed at each end of the rail, and may require the use of a costly junction box or grommet or baffle to make the holes visually acceptable and/or noninjurious to the cables. Further, it may reduce the length of the portion of the rail to which instruments can be attached. Additionally, by removing load-carrying material from the rail, holes in the rail sidewalls create stress risers, compromising the rail's mechanical structure at the very locations at which it may need to be strongest—the end joints.

One might also wish to consider the use of holes in the legs for passing cables out the end opening of one rail and into the end opening of the next rail without exiting the stand structure. But a little thought shows the difficulty this practice would create with respect to rail horizontal angle adjustment or collapse for transport or vertical rail end height adjustment, as any of these may cause a shearing action between the rail end and edges of the hole in the leg which could cause cables to be cut, damaged, or at least stressed. Further, once again a structural member, in this case the leg, would have its strength and stiffness compromised by a major interruption in its load-bearing structure.

BRIEF DESCRIPTION OF THE DRAWINGS

In the following descriptions, the terms rear and front are intended relative to a user of the apparatus. Thus, a front view would show the front of a user of the apparatus, if that user were shown in the figure.

FIG. 1b(1) shows a side view of a coupler designed to retain an arm to which may be attached a riser or instrument.

FIG. 1b(2) shows a side view of an embodiment of two inventive coupler apparatus.

FIG. 1b(3) shows a side view of a foot of an embodiment of the inventive support apparatus.

MODES FOR CARRYING OUT THE INVENTION

Figure 1A:
FIG. 1a shows a plan view of an embodiment of the inventive support apparatus in a fully extended configuration.
Figure 1C:
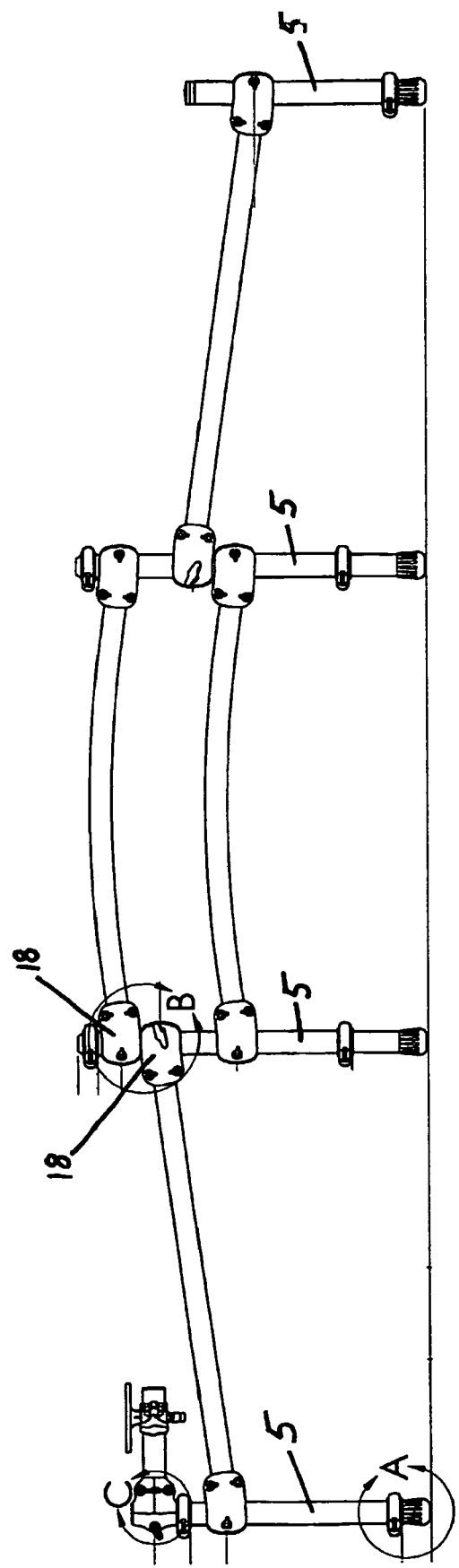
FIG. 1c shows a side view of an embodiment of the inventive support apparatus having two center support tiers and in fully extended configuration.
Figure 2:
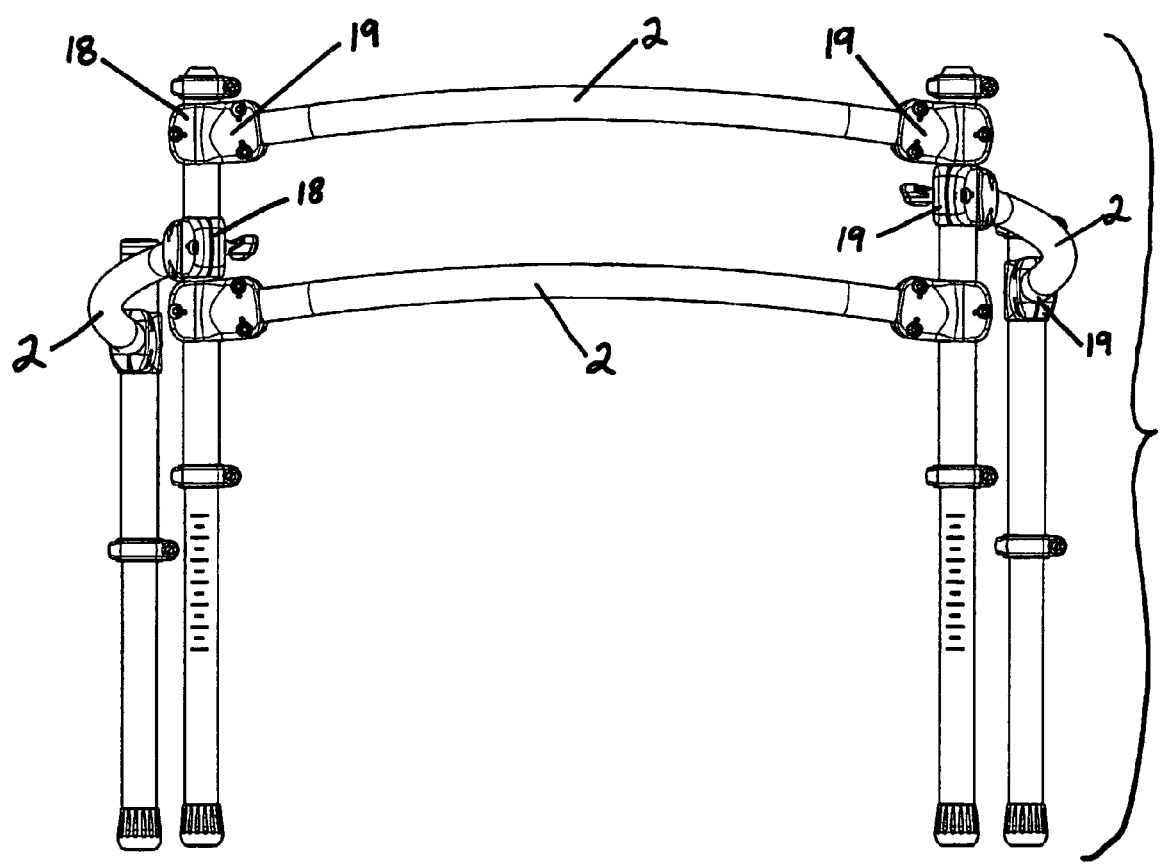
FIG. 2 shows front view of an embodiment of the inventive support apparatus in a typical set-up (deployed) configuration.
Figure 3:
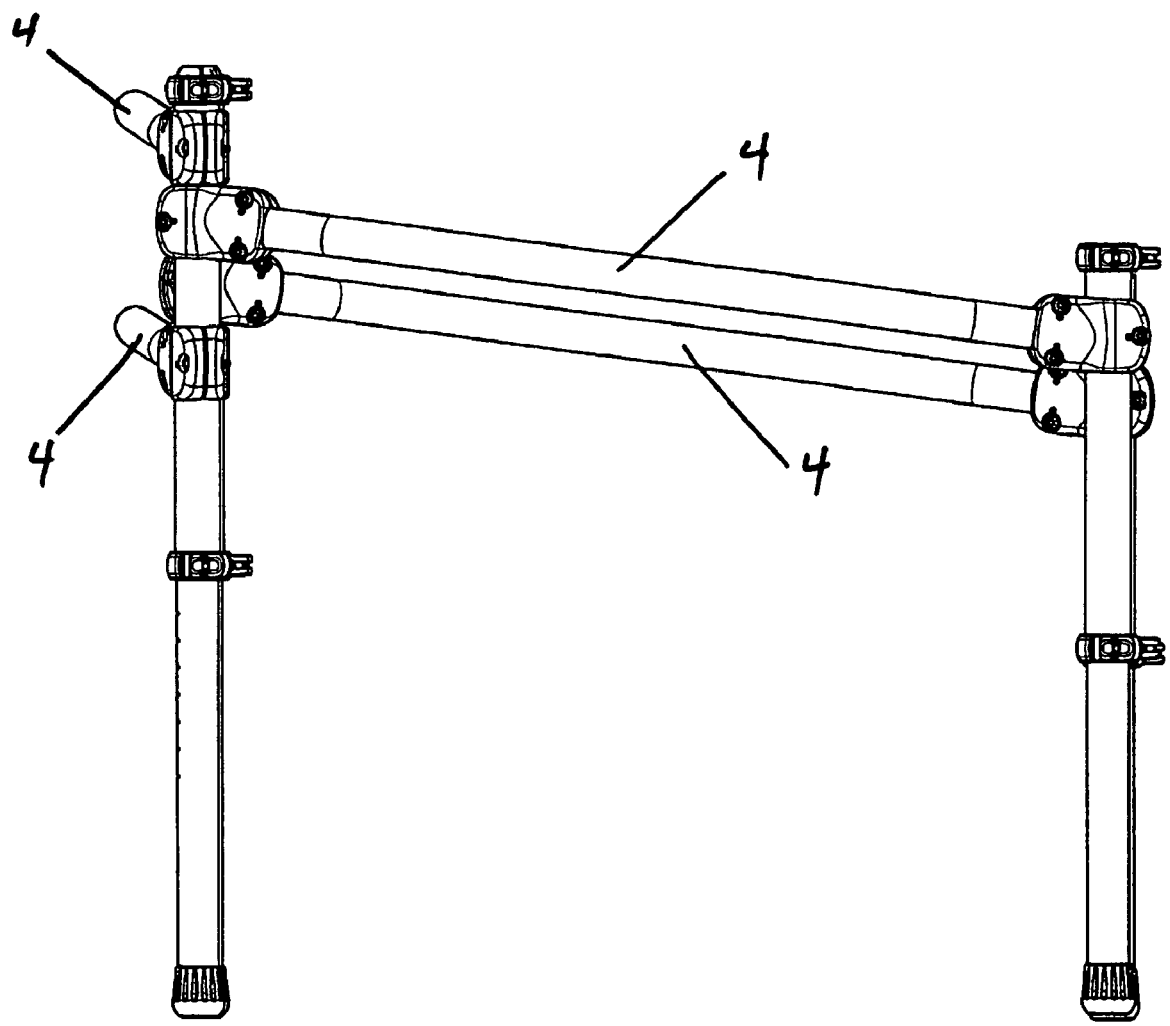
FIG. 3 shows a side view of an embodiment of the inventive support apparatus in a typical set-up configuration.
Figure 4:
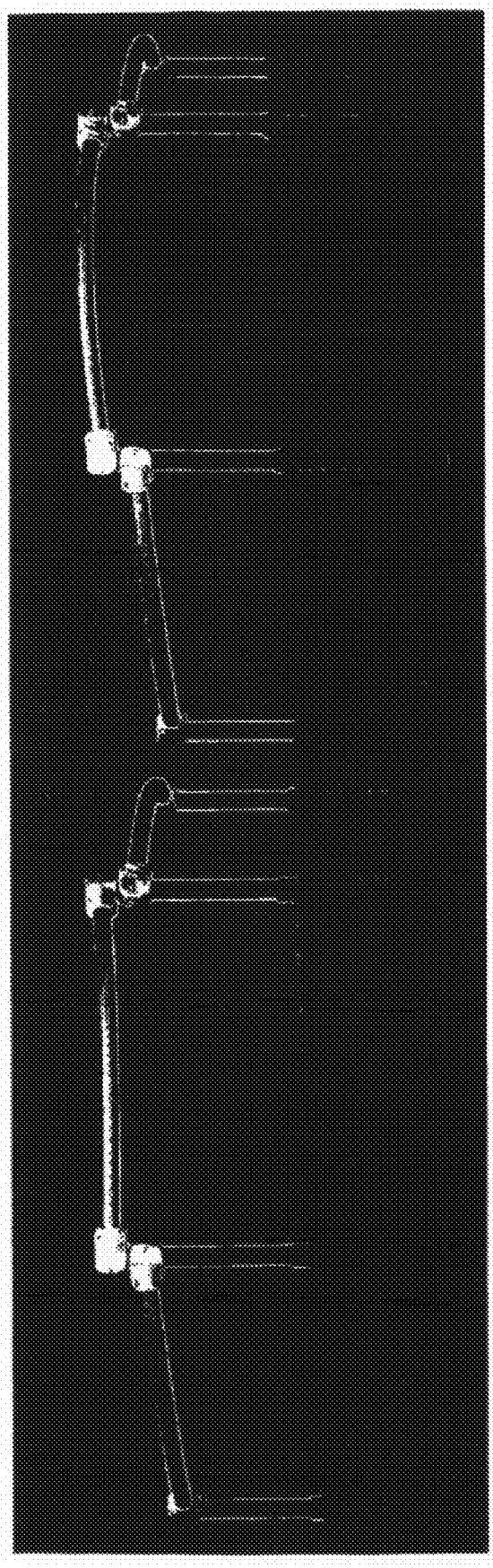
FIG. 4 shows perspective front views of an embodiment of two inventive support apparatus in a typical set-up configuration.
Figure 5:
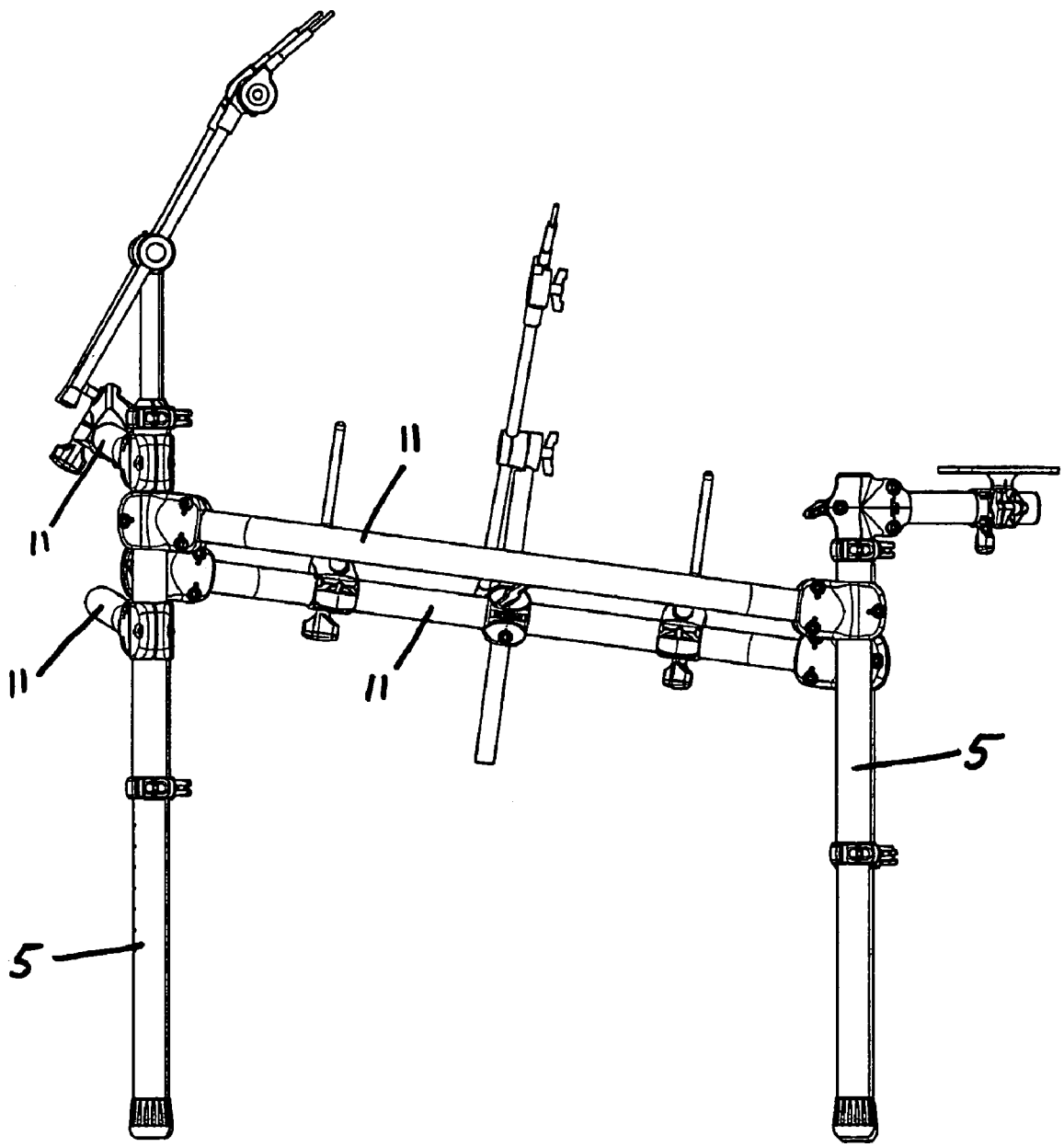
FIG. 5 shows a side view of an embodiment of the inventive support apparatus with risers attached thereto and in a typical set-up configuration.
Figure 6:
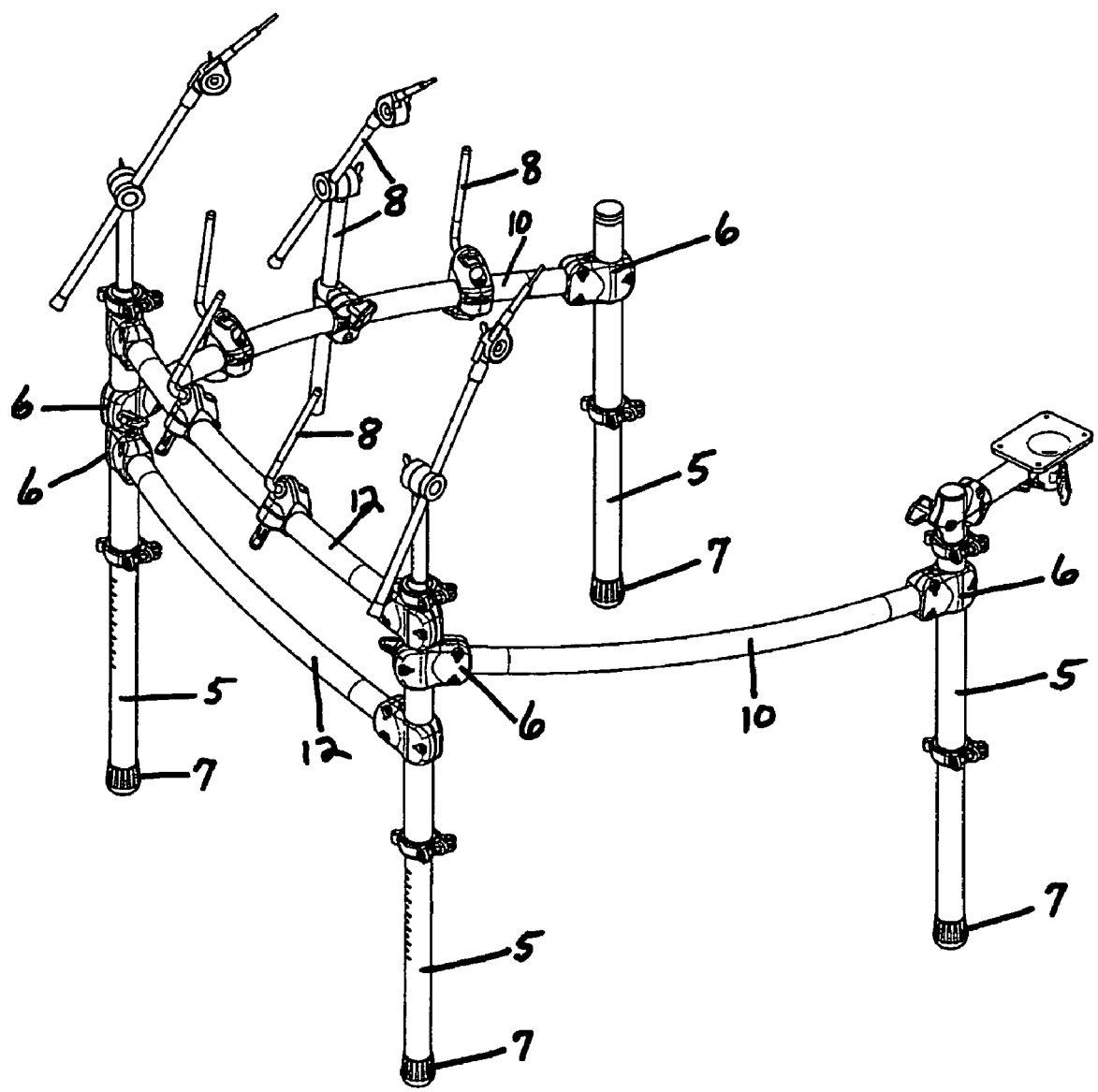
FIG. 6 shows a perspective aerial view of an embodiment of the inventive support apparatus with risers attached thereto and in a typical set-up configuration.
Figure 7:
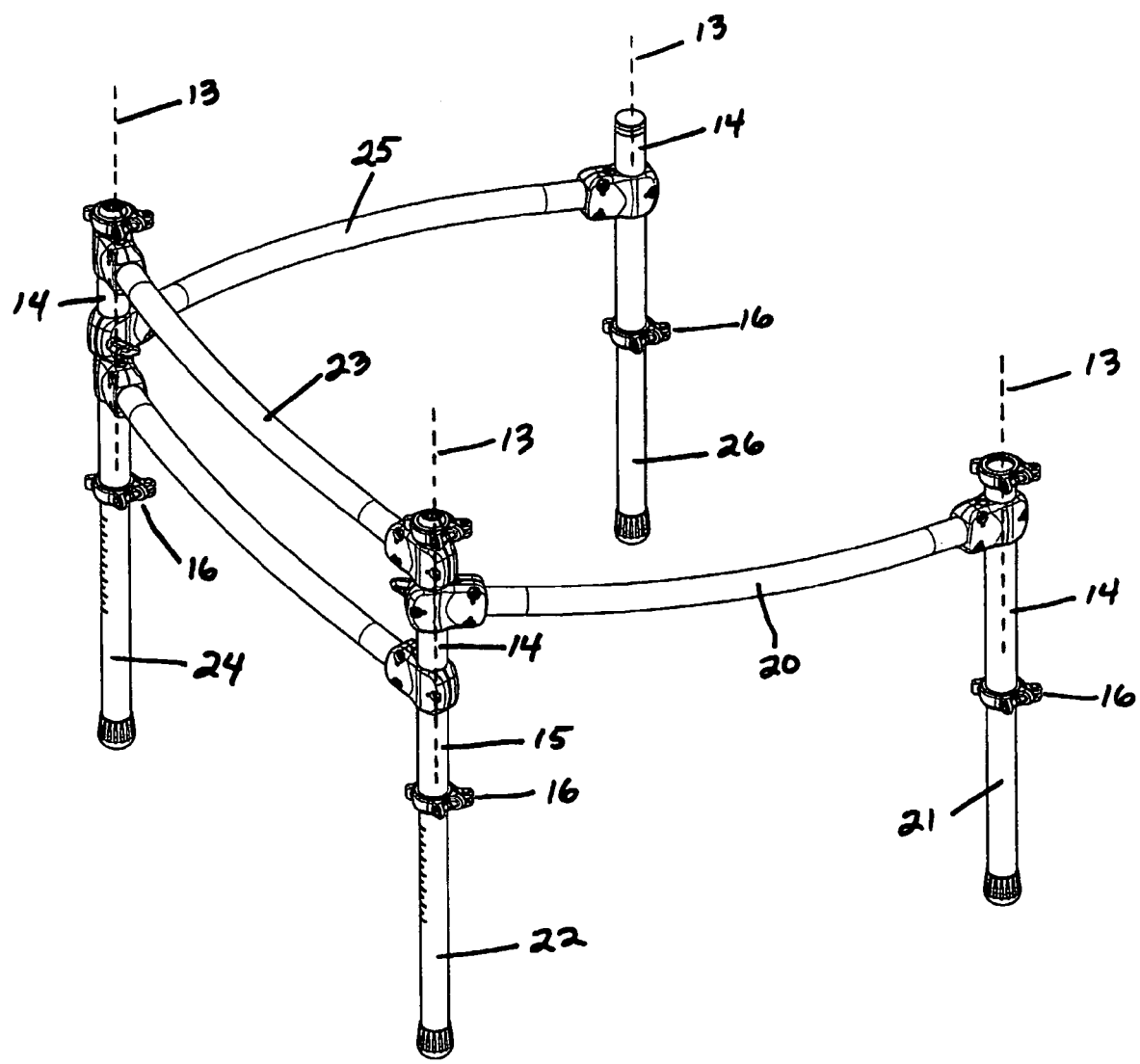
FIG. 7 shows a perspective aerial view of an embodiment of the inventive support apparatus in a typical set-up configuration.
Figure 8:
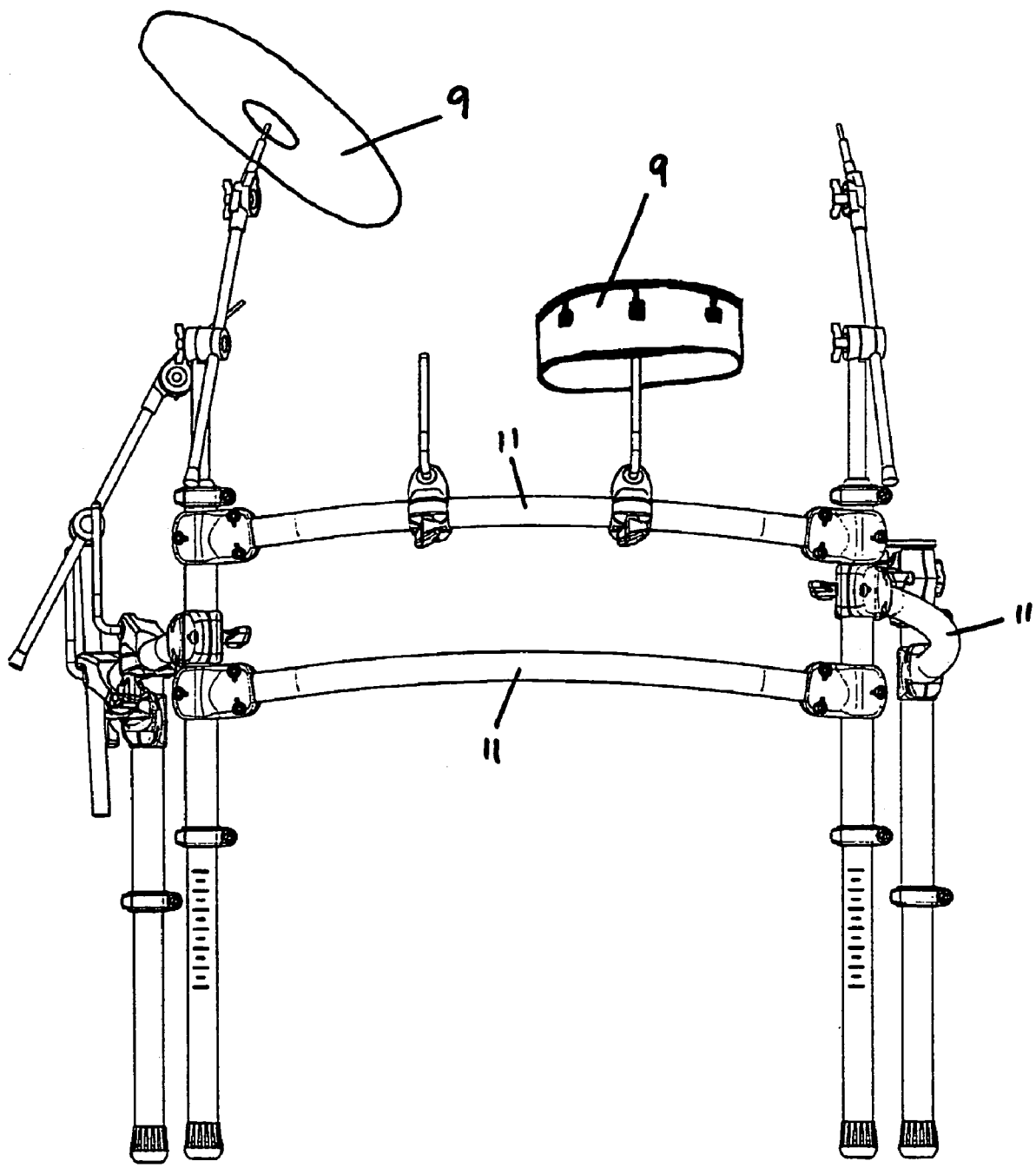
FIG. 8 shows a front view of an embodiment of the inventive support apparatus in a typical set-up configuration, and with risers attached thereto and instruments attached to some of the risers.

As mentioned above, the present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should further be understood to support and encompass descriptions and claims of all the various embodiments, systems, techniques, methods, devices, and applications with any number of the disclosed elements, with each element alone, and also with any and all various permutations and combinations of all elements in this or any subsequent application.

FIGS. 1-8 show support apparatus 1 in accordance with embodiments of the inventive technology. The embodiments covered by the claims are not limited to the embodiments shown in the figures. The figures show item support rails 2 (e.g., musical instrument support rails, such as percussion instrument support rails 4) and rail support legs 5 coupled to these support rails by couplers 6 (also referred to as coupler apparatus).

Figure 9:
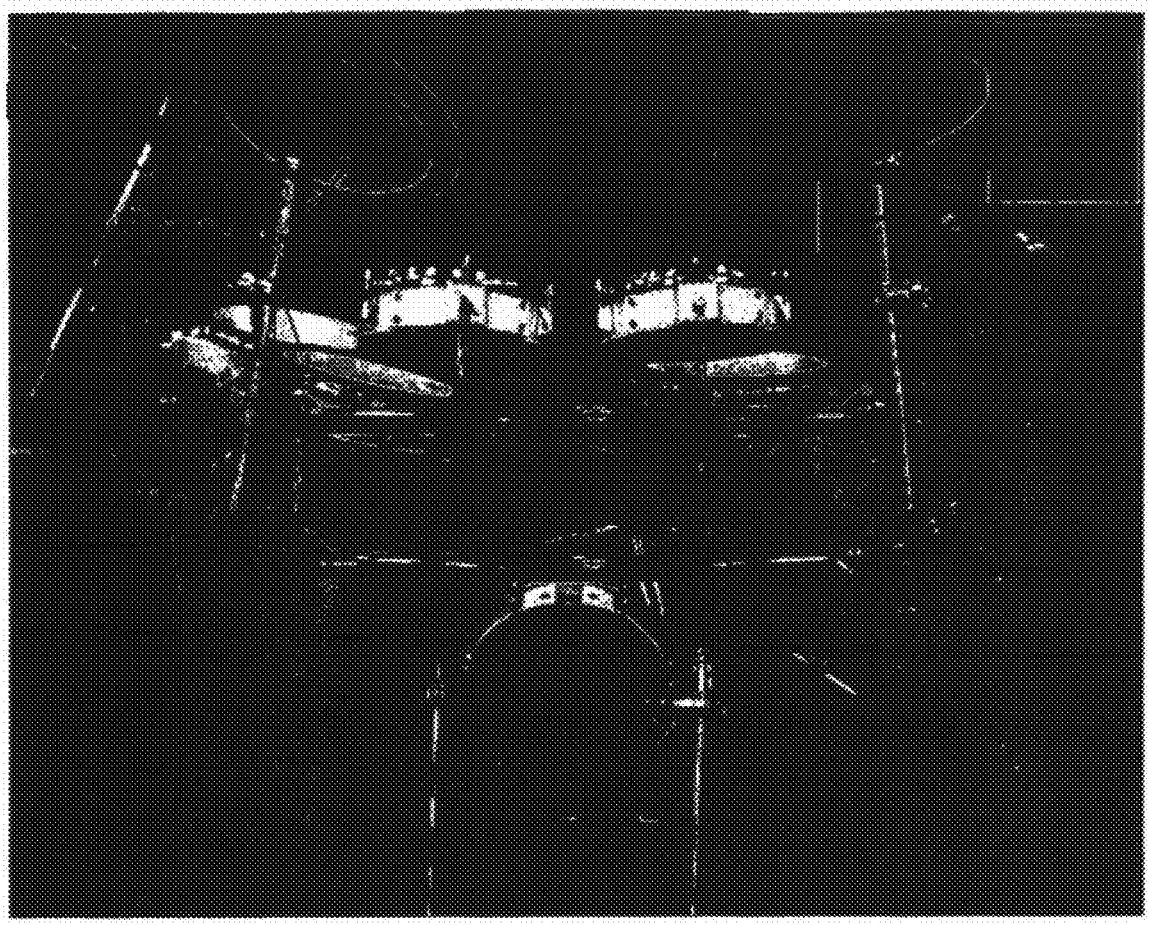
FIG. 9 shows a photograph of an embodiment of the inventive support apparatus in a typical set-up configuration with percussion instruments attached either directly to tiers or to risers that are attached directly to tiers.
Figure 10:
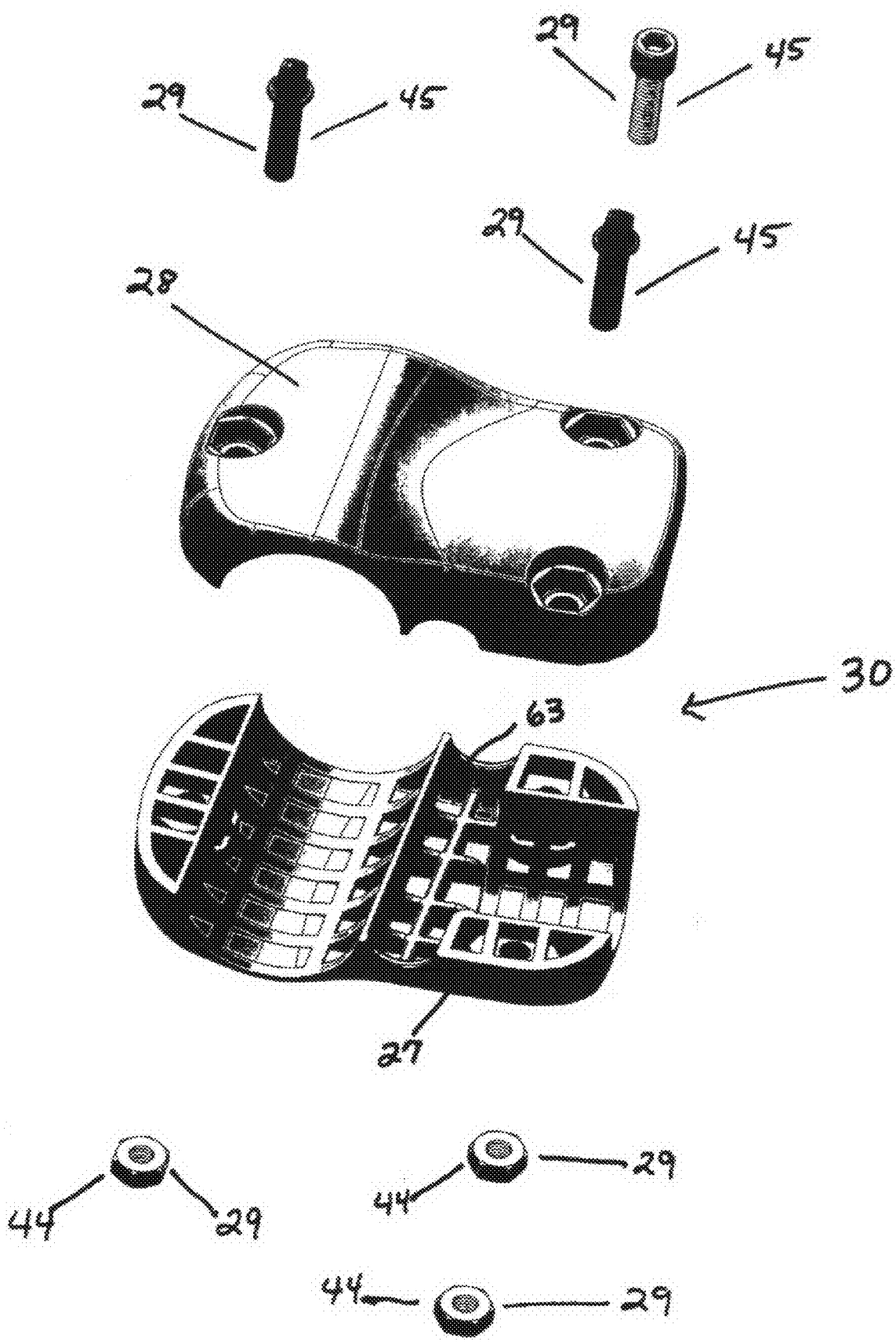
FIG. 10 shows an exploded view of an embodiment of the inventive coupler apparatus.
Figure 11:
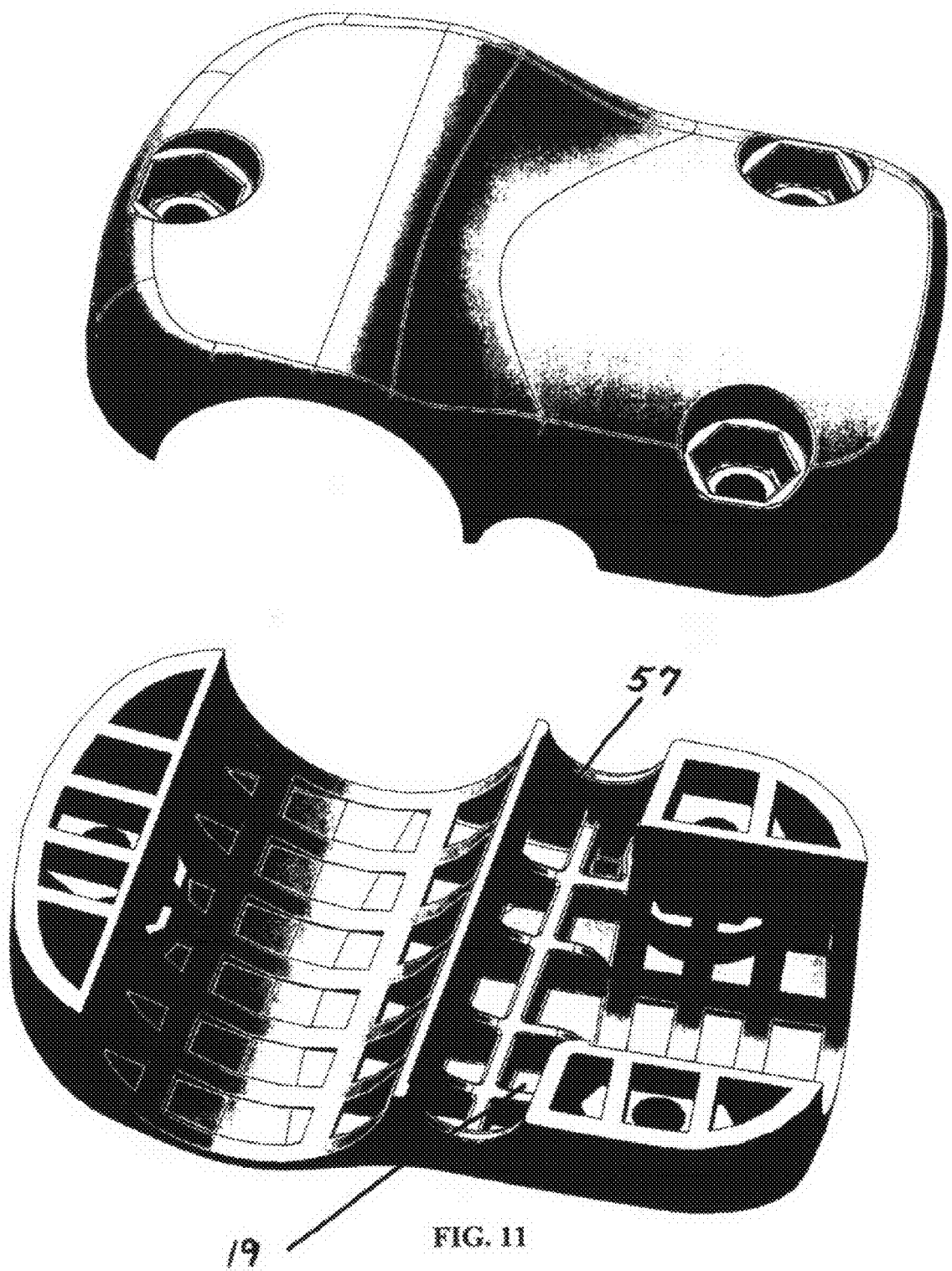
FIG. 11 shows an embodiment of compression elements that form parts of the inventive coupler apparatus.
Figure 12A:
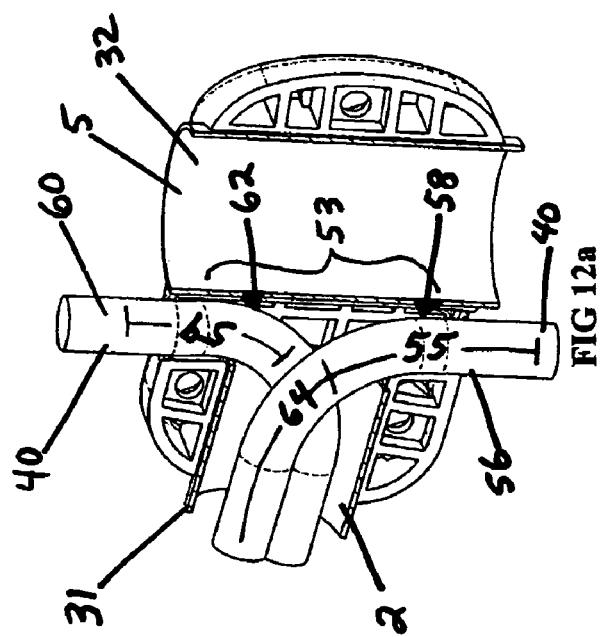
FIG. 12a and 12c show views of the inside of an embodiment of one of the compression elements, in addition to cables established against it.
Figure 12C:
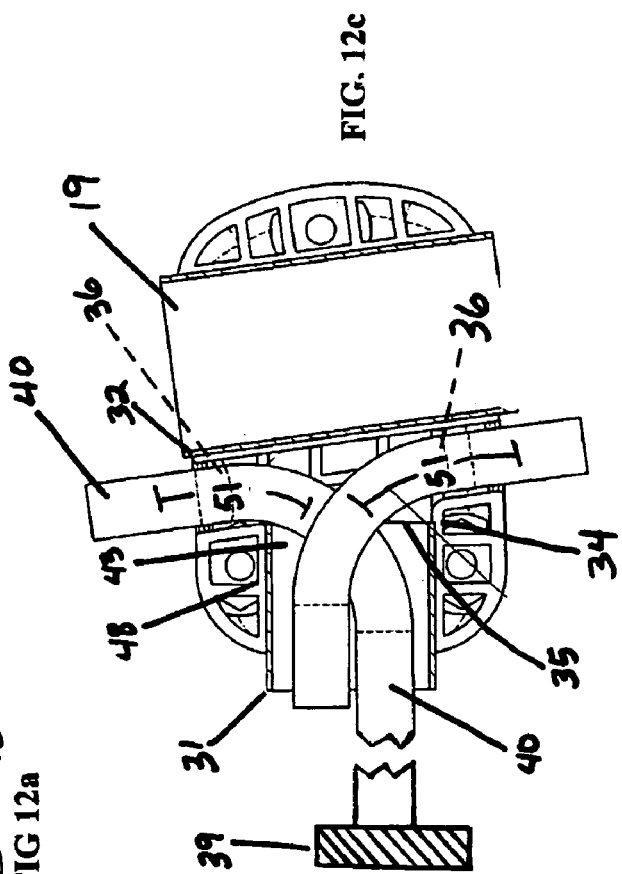
Figure 12B:
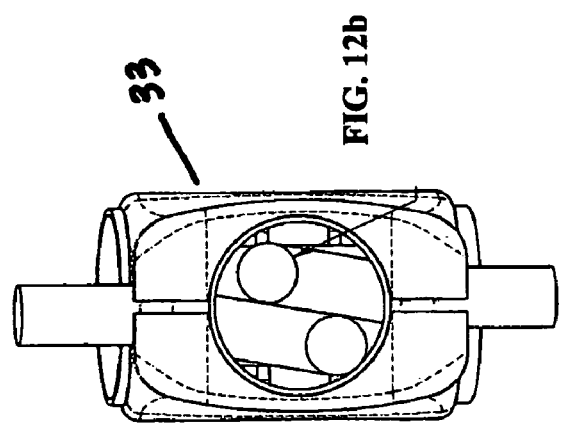
FIG. 12b shows an embodiment of a coupler apparatus (in addition to a cutaway view of cables passing therethrough) as viewed from where a riser that would be retained by it would be established.
Figure 13:
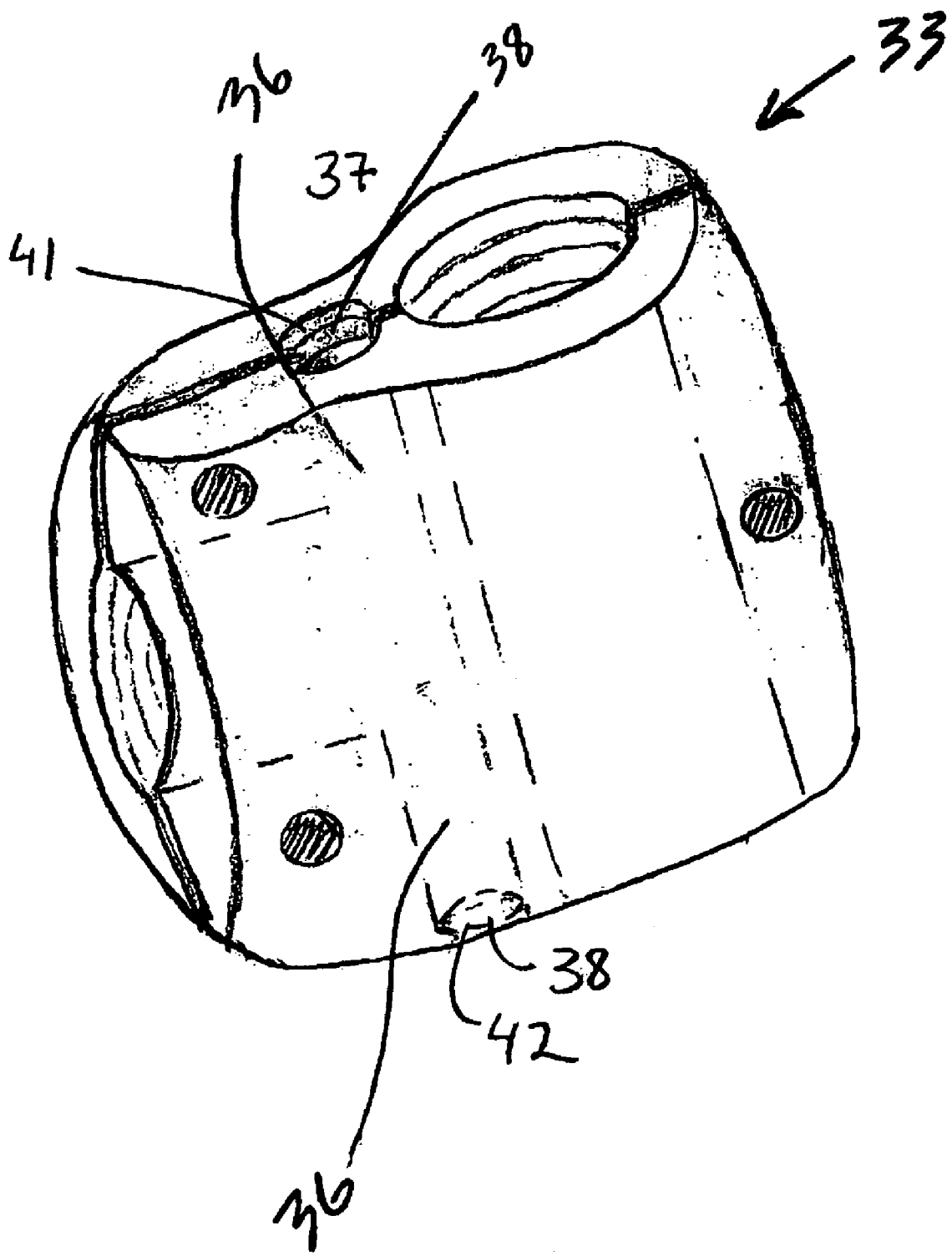
FIG. 13 shows a perspective view of two compression elements of the inventive coupler apparatus established in an oppositely facing orientation.
Figure 14:
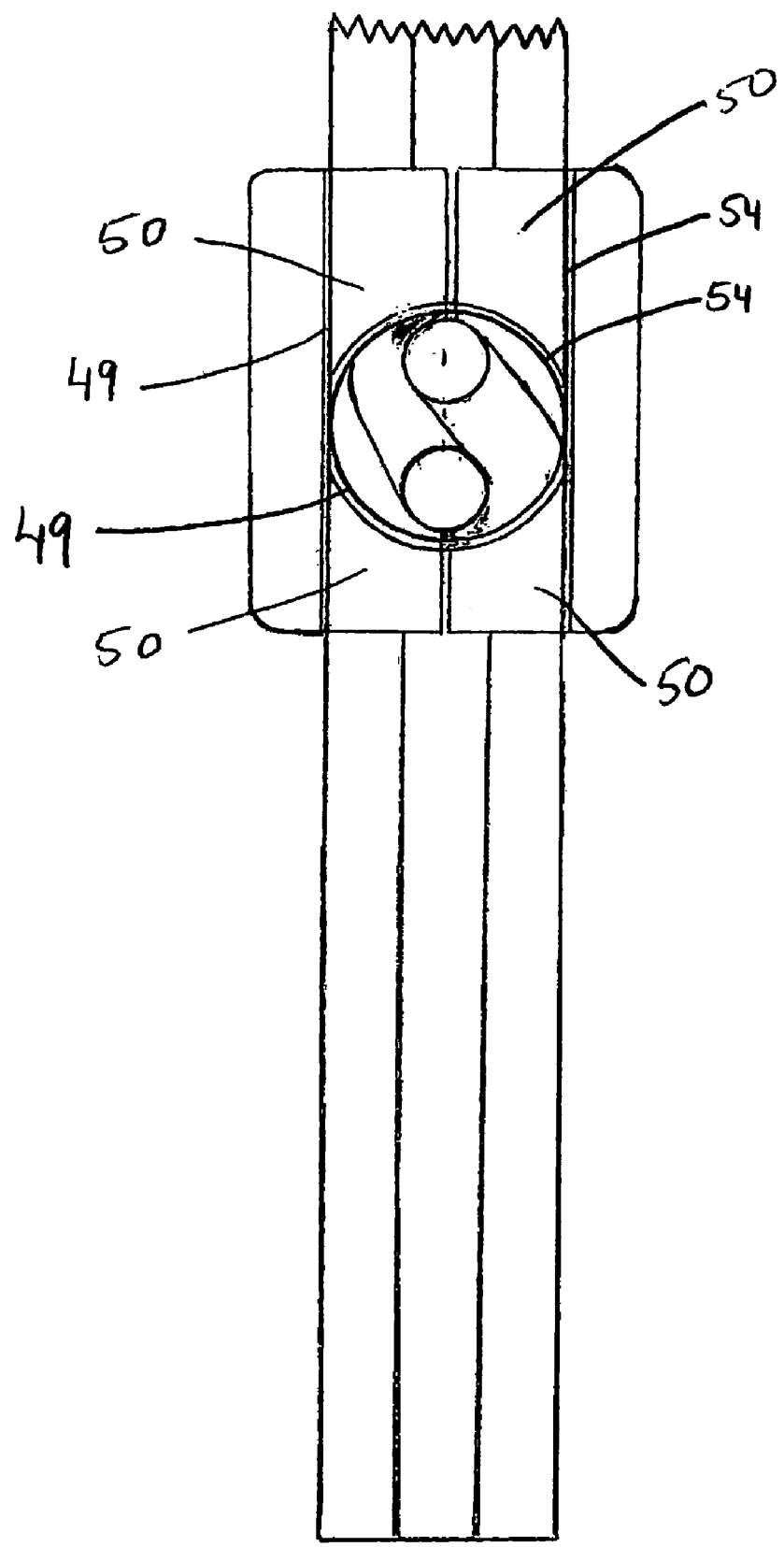
FIG. 14 shows a view of part of a rail support leg and of a coupler apparatus (in addition to a cutaway view of cables passing therethrough) as viewed from where a riser that would be retained by it would be established.
Figure 15:
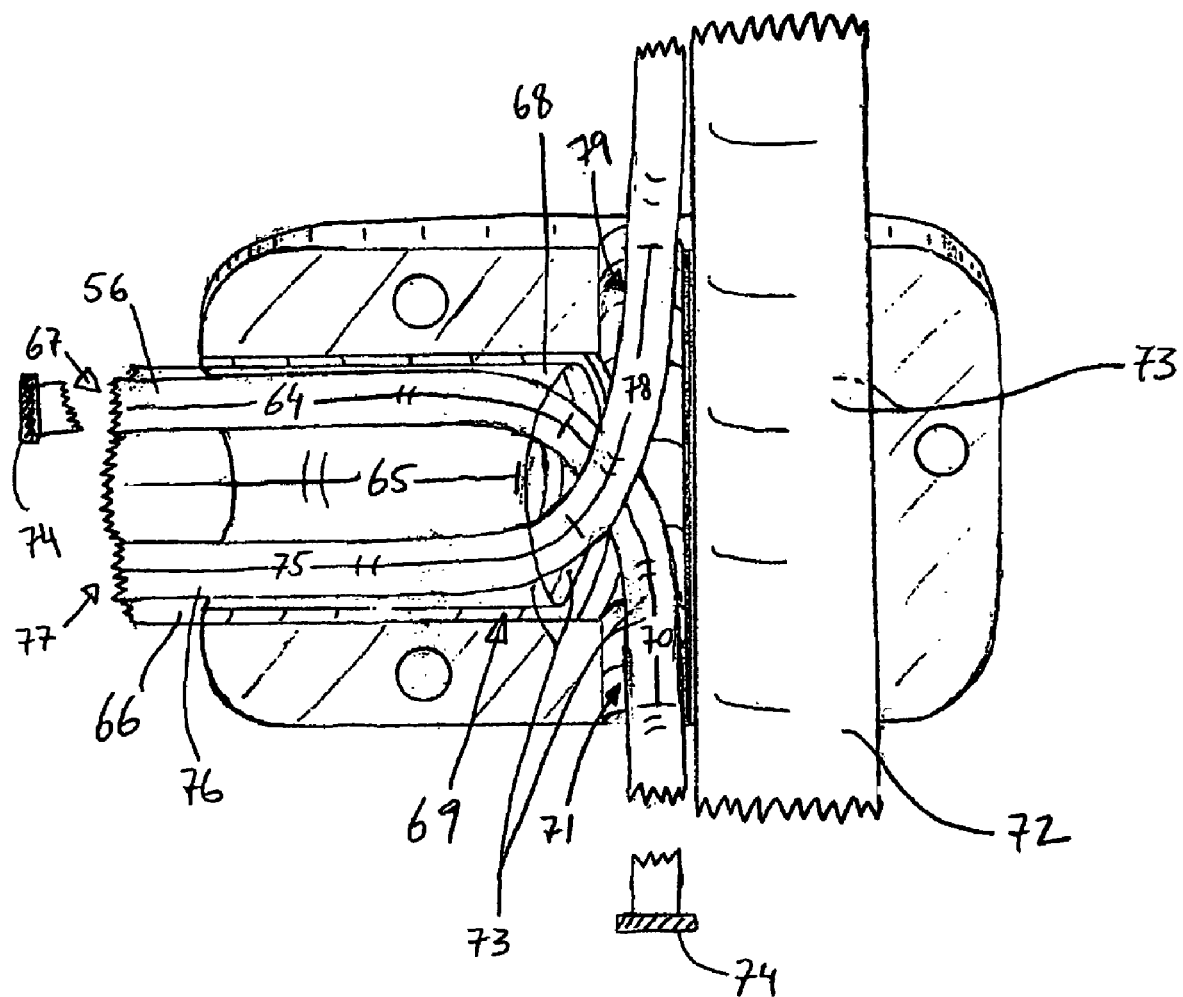
FIG. 15 shows a view of a portion of a rail support leg, an item support rail, and one of the compression elements of an embodiment of the coupler apparatus that couples the rail support leg to the item support rail, in addition to cables passing therethrough.

In embodiments shown, the rail support legs have lower ends 7 adapted to rest on a lower supporting surface (e.g., a floor, such as a stage floor). Particularly in those embodiments where the apparatus has two legs, at least one of the legs may have stabilizing projections that emanate from a lower portion of the leg and are adapted to contact the underlying surface with lower ends at points other than directly below the leg, thereby preventing toppling of the apparatus. It should be understood that the inventive technology includes stands having only two legs (at least one of which has more than one lower end that serve as stabilizing projections) and stands having three or more legs (none of which have stabilizing projections). Further, after disattachment of any risers 8 and instruments 9 that may be attached directly to the apparatus or risers, the support apparatus may be collapsible such that in its collapsed configuration it occupies a smaller volume. As shown in FIG. 9, cable ports and couplers through which cable(s) may pass may allow for the provision (e.g., manual) of cable slack external of a cable port through which it may pass in order to facilitate collapsing of some embodiments of the inventive support apparatus having internal cabling. It is of note that the instruments may be attached to the risers or the rails by instrument attachment devices.

An item support rail 2 (again, a broad term that includes, inter alia, a percussion instrument support rail 4) is typically an elongated member (e.g., a tube or pipe or bar, whether hollow or not), may exhibit any of several cross-sections (e.g., circular, oval, polygonal, hexagonal, rectangular, non-circular annular, and/or square, whether referring to the outer surface of a non-hollow member or a hollow member, as but a few examples), and may be straight or curved (which includes curved in some sections and straight in other(s)). A support rail may curve outward as in FIG. 2. For purposes of clarity of description, item support rails may be described as having a left end and a right end, where such nomenclature is relative to a user of the apparatus of which the rails form a part (e.g., a seated drummer at least partially surrounded by the drum set rack). Where there are more than two item support rails in a single apparatus, the outer rails 10 (e.g., the furthest left and the furthest right) may be referred to as peripheral item support rails, while the other rail(s) may be referred to as center item support rail(s) 12.

It should be understood that an item support rail 2 which, in an installation configuration (e.g., when the support apparatus is set up as intended, on a horizontal lower surface), has any portion which is at an elevation that is different from that of a remaining portion of that rail is a non-horizontal item support rail 11 (n.b., the term non-horizontal as used in this term modifies the rail, not the item). A non-horizontal rail, as defined herein, may be, e.g., curved, straight, stepped (even with horizontal sections) or exhibit a combination of two or more of these characteristics. It should be pointed out that a non-horizontal rail can have ends substantially at the same height.

The rail support legs 5, to each of which may be coupled one or more item support rails, may also be elongated, and may exhibit any of several cross-sectional shapes (e.g., circular, oval, polygonal, hexagonal, rectangular, non-circular annular, square, and/or C shaped, whether referring to the outer surface of a non-hollow member or a hollow member, as but a few examples). One or more rails may be coupled to a rail support leg. The legs may be straight or curved (a curved leg may have straight section(s)). A leg may define a substantially vertical axis 13 (e.g., the leg may itself have a vertical centerline 14) which may be the same as an axis about which a pivot coupler (e.g., a pivot coupler apparatus) allows rotation of a coupled rail (rotation does not require a full rotation, as a mere sweep of a few degrees is deemed rotation). It should be noted that a straight, vertical rail support leg 15 is a type of straight rail support leg. Further, any of the legs may be height adjustable upon manipulation of a leg height adjustment apparatus 16 such as a clamp.

Particular embodiments of the inventive technology may include a left, percussion instrument support rail 20 supported by a furthest left, rail support leg 21 and a center left, rail support leg 22; a center, percussion instrument support rail 23 supported by the center left, rail support leg 22 and a center right, rail support leg 24; and a right, percussion instrument support rail 25 supported by the center right, rail support leg 24 and a furthest right, rail support leg 26. Each rail may be coupled to its respective rail support legs by couplers. Of course, such particular embodiments are only certain of the many embodiments within the ambit of the inventive technology.

It should be understood that the inventive technology includes not only inventive apparatus but also inventive methods (e.g., support methods), which may include steps such as "establishing at least one item support rail as a non-horizontal item support rail". This limit may include positioning a straight or curved, item support rail as a non-horizontal item support rail, which step may be effected upon appropriate coupler of the rail.

It is also of note that one application of the inventive technology is musical instrument support and, in particular, percussion instrument support. Percussion instruments that may be supported by the apparatus include, but are not limited to, drums, high hats, and cymbals. Percussion instruments may be attached directly to not only the rails, but also the legs (e.g., the upper portion of the legs). They may instead be attached directly to risers that attach directly to a rail or leg. As mentioned, the apparatus and methods may find application not only to musical instrument support, but also to the more general field of item support. Items supported include, but are not limited to percussion instruments and indeed anything that one might want to establish in a manner similar to drums of a drum set for display or use.

FIGS. 9-14 show types of coupler apparatus 17. The aforementioned coupler (also shown as part of the support apparatus in FIGS. 1-8) relates to this specific type of coupler apparatus 17. It should be understood, of course, that these figures relate only to certain embodiments of the broader inventive coupler apparatus technology, which includes within its ambits the apparatus shown in the figures in addition to apparatus that are not shown but otherwise adequately described.

The couplers shown include pivot couplers 18 that may enable rotatable motion of the rail about a substantially vertical axis 13 (such rotatable motion may first require manipulation of the coupler by a user, although this is not a requirement for all embodiments). Substantially vertical axes includes those axes that are from approximately 85-95 degrees relative to a horizontal supporting floor that the axis passes through. This vertical axis may be defined by a rail support leg (e.g., the axis may be substantially the same as a centerline defined by the leg) and/or the pivot coupler (e.g., the axis may pass through the substantial center of an opening 19 of the coupler through which the coupled leg passes).

It should be understood that each the term "coupler" or "coupler apparatus" is a broad term that includes an apparatus that is operable to, e.g., sufficiently retain one member in substantially fixed position relative to another member coupled thereto. A coupler may be releasable to release retained members and/or perhaps to allow rotation of one or both of the retained members relative to the other; it may be detachable from the apparatus of which it forms a part, although these features are not necessarily implied by the use of the term. Of course, a coupler may directly contact retained members at ends or at parts other than their ends.

In their typical application, the couplers would couple structural support members (which play a role in providing support as desired), and thus could be properly characterized as structural support member coupler apparatus. When the structural support members that they couple are part of a musical instrument support apparatus (e.g., a drum stand), they may be referred to as musical instrument structural support member coupler apparatus or, more specifically, percussion instrument structural support member coupler apparatus.

Typically, two or more couplers will couple each rail to rail support legs (e.g., one coupler per attachment). Of course, a coupled item support rail is an item support rail that is coupled (e.g, to a rail support leg) by a coupler. These couplers may be located anywhere along the length of a rail, such as at either end thereof. Any of these couplers may be pivot couplers 18 that pivotally couple a rail to a rail support leg, enabling rotatable motion of the rail (perhaps such rotatable motion can take place only after manipulation of the coupler and/or application of a sufficient torque to the rail). This rotatable motion may be about a substantially vertical axis, and it may be that such motion is possible only after manipulation of the coupler (e.g., unscrewing screws or disengaging a clamping lever) to release the coupler, although, again, this is not a requirement. Any of the couplers may enable height adjustment of a coupled rail. This height adjustment may be substantially purely vertical translatory height adjustment (e.g., where the rail is attached to two legs and the couplers, perhaps upon release, enable the rail to be raised or lowered vertically, without any rotation or component of horizontal motion of the rail). However, this height adjustment may instead be of a different nature (e.g., substantially no elevation change in the rail at one of the couplers but instead a rotation about a horizontal axis passing through that coupler and concomitant elevation changes at different parts of the rail).

Any coupler may couple a rail to a leg at an angle (e.g., a relative angle) other than ninety degrees 19 (e.g., 95 degrees, 85 degrees, 92 degrees, 87 degrees, as but a few of many examples). Of course, it may be this feature that allows a coupled non-horizontal item support rail to rotate about a vertical axis (e.g., one that passes through a pivot coupler).

It should also be noted that any of the legs (or indeed, even any of the rails) may be extended or shortened at any point along their lengths by a telescoping mechanism such as a collar clamp 16. Of course, such a mechanism would afford an often desirable manner of adjustment.

A coupler apparatus may comprise a first compression element 27; a second compression element 28; and at least one compression enhancement element 29. These first and second compression elements, when (a) being established in an oppositely facing orientation 30 at least partially around two members to be retained 31, 32 (so as to establish a compression configuration 30 of the coupler apparatus), and (b) when sufficiently compressed towards one another upon operation of the at least one compression enhancement element, may retain in substantially fixed relation the two members (e.g., an item support rail and rail support leg) to be retained. One of the members to be retained (e.g., the rail) may have a terminus 34 (e.g., a rail end) between the first and the second compression elements when the compression elements are established in the compression configuration, and that terminus may define an terminus interface 35. Further, the first and the second compression elements, when established in the compression configuration, may establish a cable channel 36 adapted to direct at least one cable from outside 37 of the first and second compression elements to through the terminus interface. The compression elements may be attached (e.g., via a hinge) or detached (e.g., not connected) from one another prior to their establishment in the compression configuration. The compression elements may be substantially identical such that each is a substantial compression element half, or, of course, they can be dissimilar.

The cable channel may establish at least one cable port 38 that is open to the environment external to the compression elements 37 when they are in their compression configuration. Each cable port may have a diameter that is greater than the diameter of a cable 40 passing through the port, but less than the diameter of a cable end connector 39 located at an external end of the cable 40. Alternatively or in addition, the cable 40 may be provided with a grommet or a widened section having a diameter that is greater than that of the port, located external to the port. With such dimensions, the cable end connectors 39, grommet or widened section may inhibit an accidental withdrawal of the connector end of the cable into the port. There may be an upper cable port 41 and a lower cable port 42 in those embodiments where there is more than one cable port. Where there are two cables, the cables may cross 43 (e.g., one behind the other) substantially at their intersection with the terminus interface. This interface may be hidden from view when the compression elements are established in a compression configuration.

The compression enhancement elements may include a wide variety of devices, structures or features, such as at least one nut 44 and at least one bolt 45, a compression lever arm, clasps, elastic securing devices, a toothed strap and lever, as but a few examples.

The coupler apparatus may be an item support structure parts coupler apparatus 46 (e.g., an apparatus that retains in substantially fixed relative position two or more parts of an item support structure such as an item support apparatus). More specifically, it may be a percussion instrument support structure parts coupler apparatus 47 (e.g., an apparatus that retains in substantially fixed relative position two or more parts of a percussion instrument support structure such as a percussion instrument support apparatus). Where the coupler apparatus retains an item support rail in substantially fixed position relative to a rail support leg, the coupler apparatus may be an item support rail and rail support leg coupler apparatus.

The item support rails, rail support legs and the couplers may be fabricated of any variety of materials, including, but not limited to: steel, metal, plastic, composite materials, fiberglass, and/or alloy, as but a few examples. The rails, legs and couplers need not be of the same material, of course. All parts or elements can be made from any of a variety of well known methods, including but not limited to injection molding, molding, die casting, extrusion, roll forming, welding, turning, stamping, drilling and/or piercing, to name a few.

A coupling method may comprise the steps of: positioning a terminus of an item support rail in a desired retention position 48 relative to a rail support leg to which it is to be retained; establishing a first compression element against a first side 49 of the item support rail terminus and a portion 50 of the rail support leg that is proximate the terminus 34; establishing a length 51 of each of all of the at least one cable exiting the terminus in a channel portion 63 in a desired cable installation position 53; establishing a second compression element 28 against a second side 54 of the item support rail terminus and a portion 50 of the rail support leg that is proximate the terminus 34; enhancing the compression effected by the compression elements on the terminus and the portion of the rail support leg that is proximate the terminus; and retaining the terminus of the item support rail in the desired retention position relative to the rail support leg to which it is to be retained. It should be noted that the step of "enhancing the compression effected by the compression elements" may involve screwing a bolt into a nut, operating a lever, or manipulating an elastic device, as but a few examples. Further, it may be that a step takes place as a result of the performance of an earlier or simultaneous step (e.g., the step of "retaining . . . " may take place as a result of the performance of the step of "enhancing the compression . . . "). The step of establishing a length of each of all of the at least one cable exiting the terminus in a channel or channel portion in a desired cable installation position may comprise the step of establishing a portion 55 of a first cable 56 in a first channel portion 57 in a first desired position 58 and establishing a portion 59 of a second cable 60 in a second channel portion 61 in a second desired position 62.

Another coupling method may comprise the steps of: establishing a first portion 64 of a first cable 56 within at least a portion 65 of a first structural support member 66 so as to situate the first portion of the first cable in a desired cable installation position 67; establishing a terminus 68 of the first structural support member in a desired installation position 69 relative to a second structural support member 72; establishing a second portion 70 of the first cable in a desired cable installation position 71 relative to the second structural support member; establishing a coupler apparatus 17 substantially around at least portions of opposite sides 73 of: the terminus of the first structural support member, the second structural support member, and the first cable; and retaining the first structural support member and the second structural support member in fixed relative position, where the first cable has two termini 74, and where the coupling method does not comprise the step of pulling either of the termini of the first cable through the coupler apparatus after the performance of the step of establishing a coupler apparatus substantially around at least portions of opposite sides of: the terminus of the first structural support member, the portion of the second structural support member, and the second portion of the first cable. Additionally, the method may comprise the steps of establishing a first portion 75 of a second cable 76 within at least a portion 65 of the first structural support member 66 so as to situate the first portion of the second cable in a desired cable installation position 77; and establishing a second portion 78 of the second cable in a desired cable installation position 79 relative to the second structural support member, in addition to other steps described in the claims.

It should be noted that the step of retaining the first structural support member and the second structural support member in fixed relative position may comprise the step of compressing the coupler apparatus. Also, the step of establishing a first portion of a first cable within at least a portion of a first structural support member so as to situate the first portion of the first cable in a desired cable installation position may involve the pulling of the cable. It is also of note that a coupler apparatus can hold two members in fixed relative position and still allow those members to be moved (e.g., rotated) relative to each other, but perhaps only upon application of a sufficient force or torque, maybe after manipulation of a device or part(s) such as a compression enhancement element.

It should also be understood that the term "desired installation position" can be used relative to different parts, and indicates that position in which it is desired that the referenced part be upon installation effected by completion of the coupling method. However, because the installation that takes place upon completion of the method might not leave the cables in their final installation position (e.g., that position desired when all of the drums, e.g., are attached (either directly or with risers) to the rails or legs), it may be necessary to pull cable through the installed compression elements to its desired location. Thus, a cable can be established in its "desired cable installation position" and still be pulled to a final desired position (e.g., relative to a surrounding structural support member), as long as any cable end terminations, including connectors at the ends (which typically have diameters that are greater than that of the cable) need not be, and are not, pulled through the coupler apparatus. As is clear from this discussion, when the term cable installation position is used, the installation referred to need not be the final installation occurring after the items supported (e.g., the percussion instruments) are attached (either directly or indirectly) to the item support rails and rail support legs.

As can be easily understood from the foregoing, the basic concepts of the present invention may be embodied in a variety of ways. It involves (but is not limited to) both support and attachment techniques as well as devices to accomplish the appropriate support or attachment. In this application, the support or attachment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used, the term "element" is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting" Such changes and alternative terms are to be understood to be explicitly included in the description.

Any acts of law, statutes, regulations, or rules mentioned in this application for patent; or patents, publications, or other references mentioned in this provisional application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. U.S. Patent Documents

| DOCUMENT NO. & KIND CODE (if known) | PUBLICATION DATE (mm/dd/yyyy) | PATENTEE OR APPLICANT NAME |
|---|---|---|
| Des. 295,471 | 05-03-1988 | Lindskog |
| Des. 306,943 | 04-03-1990 | Hodge et al. |
| Des. 320,034 | 09-17-1991 | Brooks et al. |
| Des. 326,969 | 06-16-1992 | Eason et al. |
| Des. 329,342 | 09-15-1992 | Schoenig |
| Des. 336,099 | 06-01-1993 | Schoenig |
| Des. 356,901 | 04-04-1995 | Schoenig et al. |
| Des. 358,048 | 05-09-1995 | Schoenig et al. |
| Des. 364,281 | 11-21-1995 | Eason |
| Des. 372,691 | 08-13-1996 | Eason |
| Des. 375,639 | 11-19-1996 | House et al. |
| Des. 400,565 | 11-03-1998 | Ahl |
| Des. 400,735 | 11-10-1998 | House et al. |
| Des. 416,464 | 11-16-1999 | Eason |
| Des. 421,447 | 03-07-2000 | Eason et al. |
| Des. 435,365 | 12-26-2000 | Eason et al. |
| D 450,339 S | 11-13-2001 | Eason |
| D 492,587 S | 07-06-2004 | Eason |
| D 493,363 S | 07-27-2004 | Eason |
| D 742,453 | 10-27-1903 | Lake |
| 1,376,593 | 05-03-1921 | Tuttle |
| 3,823,245 | 07-09-1974 | Suzuki |
| 4,102,219 | 07-25-1978 | Plamper |
| 4,227,049 | 10-07-1980 | Thomson et al. |
| 4,479,414 | 10-30-1984 | Willis |
| 4,579,229 | 04-01-1986 | Porcaro et al. |
| 4,593,596 | 06-10-1986 | Gauger |
| 4,671,479 | 06-09-1987 | Johnson et al. |
| 4,691,611 | 09-08-1987 | May |
| 4,768,798 | 09-06-1988 | Reed et al. |
| 4,770,380 | 09-13-1988 | Eason et al. |
| 5,029,796 | 07-09-1991 | Schoenig |
| 5,048,789 | 09-17-1991 | Eason et al. |
| 5,063,821 | 11-12-1991 | Battle |
| 5,069,254 | 12-03-1991 | Vogelsang |
| 5,140,889 | 08-25-1992 | Segan et al. |
| 5,161,761 | 11-10-1992 | May |
| 5,182,416 | 01-26-1993 | Schweizer |
| 5,337,646 | 08-16-1994 | Austin |
| 5,520,292 | 05-28-1996 | Lombardi |
| 5,531,148 | 07-02-1996 | Wilson |
| 5,726,369 | 03-10-1998 | Gilday |
| 5,744,738 | 04-28-1998 | Gatzen |
| 5,857,649 | 01-12-1999 | Eason |
| 5,929,355 | 07-27-1999 | Adinolfi |
| 5,949,008 | 09-07-1999 | Augsburger |
| 5,996,814 | 12-07-1999 | Workman et al. |
| 6,062,396 | 05-16-2000 | Eason |
| 6,283,421 B1 | 09-04-2001 | Eason et al. |
| 6,343,802 B1 | 02-05-2002 | Workman et al. |
| 6,375,135 B1 | 04-23-2002 | Eason et al. |
| 6,610,916 | 08-26-2003 | Torrez |
| 6,653,540 B2 | 11-25-2003 | Izen et al. |
| 6,789,772 B2 | 09-14-2004 | Eason |
| 6,814,332 B2 | 11-09-2004 | Eason |

II. OTHER DOCUMENTS

Gibraltar Hardware, "Rack Factory" #GRS400C, Gibraltarhardware.com, Jan. 9, 2004, 2 pages
Gibraltar Hardware, "Rack Factory" GRS400C, Gibraltarhardware.com, Oct. 25, 2004, 2 pages, Ride/Crash Overhead Station and Xhat to boom and Rack Options
Gibraltar Hardware, "Rack Factory" GRS400C, Gibraltarhardware.com, Oct. 25, 2004, 2 pages, Mini Snare on Curved Support Tube Option
Gibraltar Hardware, "Rack Factory" GRS400C and GRS150C, Gibraltarhardware.com, Oct. 25, 2004, 2 pages, Boom Arm to Rack and Multi-Cymbal Overhead Station Options
Gibraltar Hardware, "Rack Factory" GRS250C, Gibraltarhardware.com, Oct. 25, 2004, 2 pages, Multi Cymbal Setup to rack, Mini Timbale to Rack, Tambourine to Open Tube, and Percussion Table to Open Tube Options
Gibraltar Hardware, "Rack Factory" GRS350C, Gibraltarhardware.com, Oct. 25, 2004, 2 pages, Triple Cymbal Station to Rack and Large Tom to Rack Options
Pintech, USA, Control the Sound with America's E Drum Color Brochure, 2004, 5 pages
Roland Corporation, roland.com MDS-10RD, printed from website as of Nov. 5, 2004
Roland Corporation, roland.com MDS-8C, printed from website as of Nov. 5, 2004
Roland Corporation, roland.com MDS-6, printed from website as of Nov. 5, 2004
Tama Hardware, PMD300FC Power Tower System, tama.com, Jan. 9, 2004, 1 page
Tama Hardware, PMD800SS Power Tower System, tama.com, Jan., 9, 2004, 2 pages
Ultimate Support Systems, Inc. 1994 Product Catalog
Ultimate Support Systems, Inc. 1996 Product Catalog
Ultimate Support Systems, Inc. 1999 Product Catalog
Ultimate Support Systems, Inc. 2000 Product Catalog
Ultimate Support Systems, Inc. 2001 Product Catalog
Ultimate Support Systems, Inc. 2002 Product Catalog
Ultimate Support Systems, Inc. 2003 Product Catalog
U.S. patent application Ser. No. 60/536,791 filed Jan. 14, 2004, 15 pages, 11 drawings
Yamaha Percussion System Drum Rack Thus, the applicant(s) should be understood to have support to claim and make a statement of invention to at least: i) each of the devices (including support and attachment devices) as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A support apparatus comprising:
   two item support rails, each partially supported by a shared rail support leg to which each of said two item support rails is coupled by a different pivot coupler,
   two additional rail support legs, each partially supporting a different one of said two item support rails,
   wherein each of said rail support legs has a lower end adapted to rest on a lower supporting surface,
   wherein each of said pivot couplers pivotally couples only one of said item support rails to said shared rail support leg, said shared rail support leg defining a substantially vertical axis,
   wherein one of said pivot couplers is established at an upper site on said shared rail support leg that is above a lower site on said shared rail support leg at which the other of said pivot couplers is established,
   wherein said each of said pivot couplers comprises separable, first and second compression elements compressed towards each other in an oppositely facing orientation with at least one compression enhancement element, and around a rail terminus of said one of said item support rails and a portion of said shared rail support leg,
   wherein said each of said pivot couplers enables rotatable motion of the item support rail that it couples, independently about said substantially vertical axis,
   wherein said each of said pivot couplers enables independent, substantially purely vertical translatory height adjustment of a different one of said item support rails relative to said shared rail support leg,
   wherein said rail terminus defines a rail terminus interface, and
   wherein said each of said pivot couplers establishes at least one cable port and a cable channel that directs a cable from travel in a first direction internally through the item support rails it couples and along a rail axis defined thereby, to travel through at least a portion of said cable channel in a second, different direction and out through a cable port,
   wherein said second, different direction is substantially parallel with said substantially vertical axis defined by said shared rail support leg.

2. A support apparatus as described in claim 1 wherein said at least one cable ports has a diameter that is less than the diameter of any cable end connectors attached to said cable.

3. A support apparatus as described in claim 1 wherein said at least one cable port comprises a first and a second cable port.

4. A support apparatus as described in claim 3 wherein said first cable port is an upper cable port.

5. A support apparatus as described in claim 3 wherein said second cable port is a lower cable port.

6. A support apparatus as described in claim 3 wherein each said cable port of said cable ports is sized to accommodate only one cable.

7. A support apparatus as described in claim 1 wherein at least one of said at least two item support rails is a non-horizontal item support rail.

8. A support apparatus as described in claim 1 wherein said support apparatus is collapsible.

9. A support apparatus comprising:
   two item support rails, each partially supported by a shared rail; support leg;
   two additional rail support legs, each partially supporting a different one of said two item support rails, wherein each of said rail support legs has a lower end adapted to rest on a lower supporting surface, two pivot couplers, each coupling a different one of said two item support rails to said shared rail support leg, said shared rail support leg defining a substantially vertical axis about which said two pivot couplers are independently rotatable and said two item support rails are independently rotatable;

wherein each of said pivot couplers couples only one of said two item support rails, wherein each of said pivot couplers comprises separable, first and second compression elements compressed towards each other in an oppositely facing orientation with at least one compression enhancement element, and around both:
   a rail terminus of a different one of said two item support rails, and
   a portion of said shared rail support leg, wherein said each of said two pivot couplers is a height adjust coupler that enables substantially purely vertical, translatory height adjustment of the item support rail coupled thereby independently of the substantially purely vertical, translatory height adjustment enabled by the other of said two pivot couplers, wherein at least one of said two pivot couplers establishes two cable ports and a cable channel between said two cable ports, wherein said cable channel guides a cable from travel in a first direction through a rail terminus interface defined by a coupled item support rail, through at least a portion of said cable channel, and then in a second, different direction through one of said two cable ports, wherein said second, different direction is substantially parallel with said substantially vertical axis defined by said shared rail support leg.

10. A support apparatus as described in claim 9 further comprising at least a third additional rail support leg.

11. A support apparatus as described in claim 9 wherein each of said cable ports has a diameter that is less than the diameter of a cable end connector.

12. A support apparatus as described in claim 9 wherein one of said two cable ports is an upper cable port and the other of said cable ports is a lower cable port.

13. A support apparatus as described in claim 9 wherein at least one of said two item support rails is a non-horizontal item support rail.

14. A support apparatus as described in claim 9 wherein said support apparatus is collapsible.

15. A support apparatus as described in claim 1 wherein, during said rotatable motion of said coupled item support rail about said substantially vertical axis, the pivot coupler that couples said coupled item support rails also rotates about said substantially vertical axis.

16. A support apparatus as described in claim 1 wherein said first and second compression elements are installed in said oppositely facing orientation around said rail terminus and said portion of said shared rail support leg, without predrilling of either of said rail terminus or said portion of said one of said shared rail support leg.

17. A support apparatus as described in claim 1 wherein said pivot couplers are each installable so as to couple a respective said only one of said item support rails to said shared rail support leg without pre-drilling of either of said respective support rail or said shared rail support leg.

18. A support apparatus as described in claim 9 wherein said pivot couplers are each installable so as to couple a said different one of said two item support rails to said shared rail support leg without pre-drilling of either of said different one of said two item support rails or said shared rail support leg.

19. A support apparatus as described in claim 9 wherein each of said item support rails coupled to said one of said rail support legs by one of said pivot couplers is rotatable about said substantially vertical axis.

20. A support apparatus as described in claim 1 wherein said each of said two pivot couplers establishes an item support rail opening and a shared rail support leg channel, and wherein said cable channel is established between said item support rail opening and said shared rail support leg channel.

21. A support apparatus as described in claim 15 wherein said each of said two pivot couplers establishes an item support rail opening and a shared rail support leg channel, and wherein said cable channel is established between said item support rail opening and said shared rail support leg channel.

22. A support apparatus as described in claim 16 wherein said each of said two pivot couplers establishes an item support rail opening and a shared rail support leg channel, and wherein said cable channel is established between said item support rail opening and said shared rail support leg channel.

23. A support apparatus as described in claim 9 wherein each of said item support rails coupled to said one of said rail support legs by one of said pivot couplers is rotatable about said substantially vertical axis.

24. A support apparatus as described in claim 18 wherein each of said item support rails coupled to said one of said rail support legs by one of said pivot couplers is rotatable about said substantially vertical axis.

25. A support apparatus as described in claim 9 wherein said each of said two pivot couplers enables independent rotatable motion of the item support rail that it couples to said shared rail support leg independently about said substantially vertical axis.

26. A support apparatus as described in claim 19 wherein said each of said two pivot couplers enables independent rotatable motion of the item support rail that it couples to said shared rail support leg independently about said substantially vertical axis.

27. A support apparatus as described in claim 9 wherein said each of said two pivot couplers establishes an item support rail opening and a shared rail support leg channel, and wherein said cable channel is established between said item support rail opening and said shared rail support leg channel.

28. A support apparatus as described in claim 18 wherein said each of said two pivot couplers establishes an item support rail opening and a shared rail support leg channel, and wherein said cable channel is established between said item support rail opening and said shared rail support leg channel.

29. A support apparatus as described in claim 19 wherein said each of said two pivot couplers establishes an item support rail opening and a shared rail support leg channel, and wherein said cable channel is established between said item support rail opening and said shared rail support leg channel.

30. A support apparatus as described in claim 25 wherein said each of said two pivot couplers establishes an item support rail opening and a shared rail support leg channel, and wherein said cable channel is established between said item support rail opening and said shared rail support leg channel.

\* \* \* \* \*